(No Model.) 3 Sheets—Sheet 1.

A. G. EMERY.
REVOLVING HORSE HOE.

No. 421,128. Patented Feb. 11, 1890.

WITNESSES:

INVENTOR:

BY

ATTORNEYS.

(No Model.)  3 Sheets—Sheet 2.

A. G. EMERY.
REVOLVING HORSE HOE.

No. 421,128.  Patented Feb. 11, 1890.

WITNESSES:
W. R. Davis
C. Sedgwick

INVENTOR:
A. G. Emery
BY Munn & Co.
ATTORNEYS.

(No Model.) 3 Sheets—Sheet 3.

A. G. EMERY.
REVOLVING HORSE HOE.

No. 421,128. Patented Feb. 11, 1890.

WITNESSES:
W. R. Davis
C. Sedgwick

INVENTOR:
A. G. Emery
BY Munn & Co.
ATTORNEYS.

UNITED STATES PATENT OFFICE.

ARD G. EMERY, OF SALINA, KANSAS.

REVOLVING HORSE-HOE.

SPECIFICATION forming part of Letters Patent No. 421,128, dated February 11, 1890.

Application filed May 14, 1889. Serial No. 310,694. (No model.)

*To all whom it may concern:*

Be it known that I, ARD G. EMERY, of Salina, in the county of Saline and State of Kansas, have invented a new and useful Improvement in Revolving Horse-Hoes, of which the following is a full, clear, and exact description.

My invention relates to an improvement in revolving horse-hoes, and has for its object to provide an implement especially adapted for cutting weeds, stubble, &c., and for pulverizing the soil between the road-wheels of the apparatus.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1:
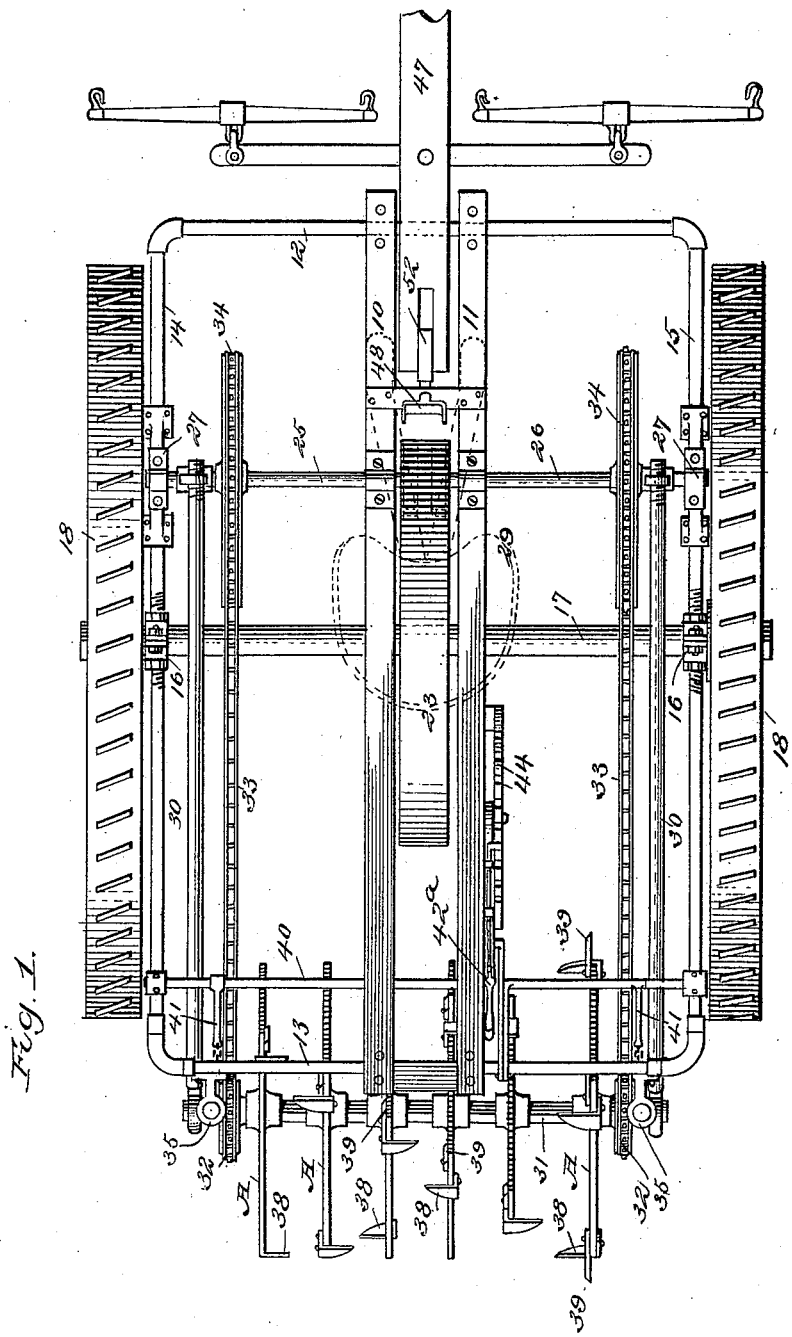
Figure 2:
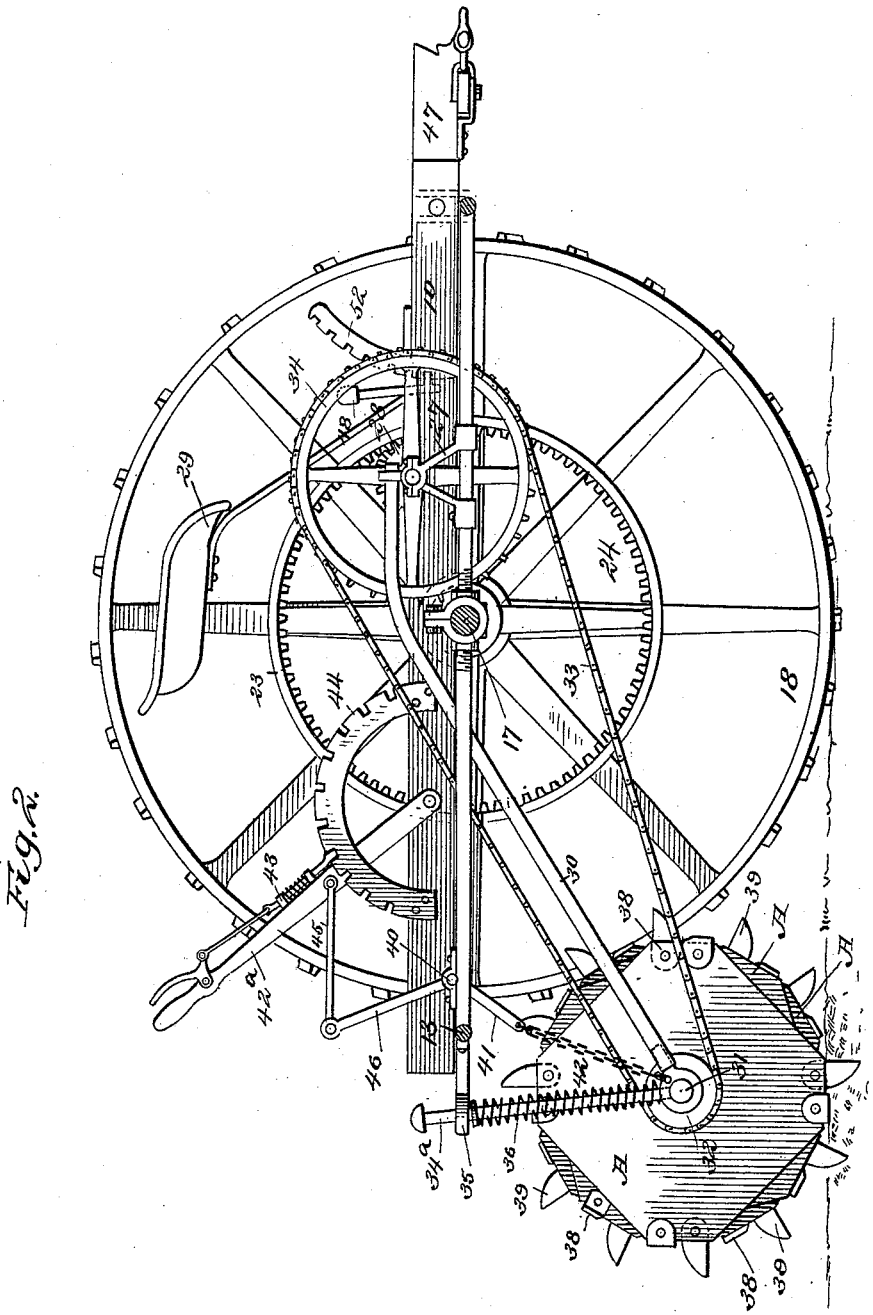
Figure 3:
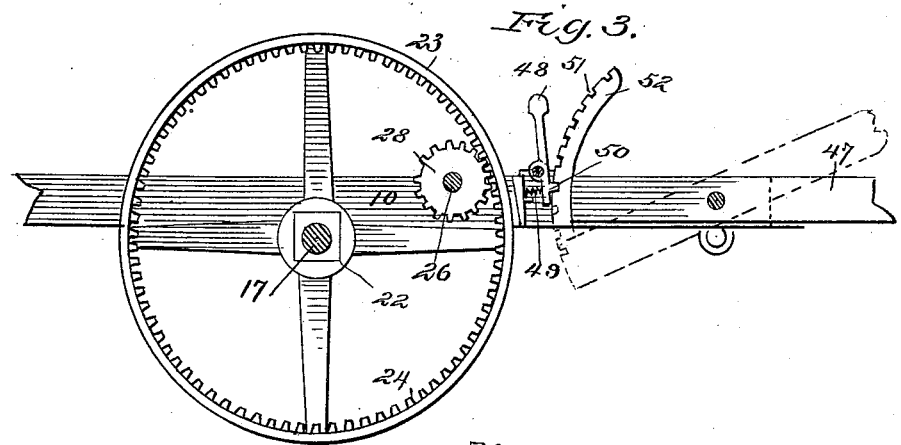
Figure 4:
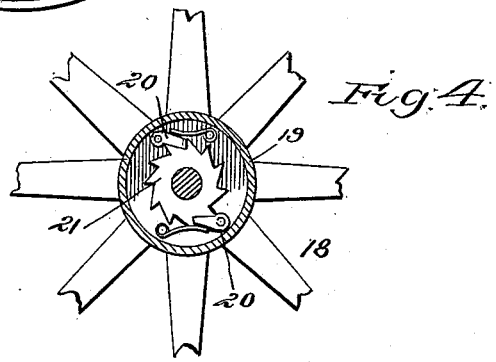
Figure 5:
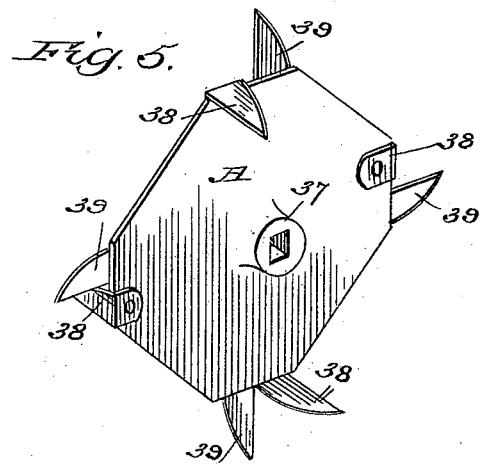

Figure 1 is a plan view of the implement. Fig. 2 is a longitudinal section taken near one of the road-wheels. Fig. 3 is a detail sectional view illustrating the manner of securing the master-wheel upon the drive-shaft, and mechanism for manipulating the tongue or pole of the implement. Fig. 4 is a detail sectional view illustrating the manner of revolving the drive-shaft from the road-wheels, and Fig. 5 is a detail perspective view of one of the revolving hoes.

In carrying out the invention the frame of the implement consists of two centrally-spaced parallel beams 10 and 11, extending longitudinally or from front to rear, and front and rear transverse bars 12 and 13, passing, respectively, from the front and rear ends of the central beams, and side bars 14 and 15, secured to the front and rear bars, as best illustrated in Fig. 1.

At or about the center of each of the side bars 14 and 15 of the frame a boxing or bearing 16 is secured, in which the axle or drive-shaft 17 of the implement is journaled, which axle or drive-shaft extends outward beyond the said side bars, and at each projecting end the axle is provided with a road-wheel 18, of any approved construction, to the inner face of which road-wheel a casing 19 is secured, provided with two spring-actuated dogs 20, as shown in Fig. 4, which dogs are adapted to contact with a ratchet-wheel 21, rigidly mounted upon the shaft or axle 17, contiguous to or within the said casing 19. The dogs are so located in the casing 19 that when the implement is drawn forward they will be in rigid contact with the ratchet-wheel 21, thereby revolving the shaft or axle 17.

Upon the shaft or axle 17, between the frame-beams 10 and 11, a box 22 is secured in any suitable or approved manner, which box is polygonal in exterior contour, and upon the said box the hub of a master-wheel 23 is mounted, which master-wheel is provided with internal teeth 24. Thus when the shaft or axle 17 is revolved the master-wheel is rotated also.

Forward of the axle or shaft 17 two transversely-aligning shafts 25 and 26 are respectively mounted at their inner ends upon the frame-beams 10 and 11, and at their outer ends in brackets 27, projected vertically upward from the side bars 14 and 15 of the frame. Each shaft 25 and 26 at its inner end is provided with a rigidly-attached pinion 28, said pinions being adapted to mesh with the internal gear of the master-wheel. Thus, through the medium of the master-wheel and the pinions 28, the shafts 25 and 26 are revolved when the implement is moved forward.

The driver's seat 29 is attached to a standard secured to the beams 10 and 11 and extending upward over the master-wheel; and in practice the master-wheel will be covered by a bonnet and floor extending from over the drive-shaft and axle to the forward end of the implement.

Upon each shaft 25 and 26, near their outer ends, a downwardly-curved rod or bar 30 is secured, and in the lower ends of the rods or bars 30 a hoe-shaft 31 is journaled, the said shaft being provided near each extremity with a small sprocket-wheel 32, which sprocket-wheels are connected by chain belts 33 with larger sprocket-wheels 34, rigidly secured to the shafts 25 and 26. Thus, through the medium of the shafts 25 and 26, the hoe-shaft 31 is revolved, the latter shaft being preferably rectangular in cross-section throughout its length, except at its bearings in the rods or bars 30.

In attaching the shaft 31 to the supporting-rods 30, which constitute practically a portion of the frame of the implement, a journal-box of any approved construction is screwed or otherwise secured to the lower ends of the rods, whereby, should the said boxes become so worn as to need to be removed, they may be readily detached and others substituted without disturbing the remaining portions of the implement. The hoe-shaft 31 is normally held a sufficient distance above the ground to cause the hoes, to be hereinafter described, to contact with the earth through the medium of a standard 34ª, attached to each end of the said hoe-shaft and projecting upward through an eye 35 on the end bar or rod 13 of the frame, as best shown in Fig. 2, and a coil-spring 36, surrounding the said standard and bearing, respectively, at one end against the upper end of the eye 35 and at the other end on the shaft 31.

The hoes A consist of a polygonal metal plate provided with a hub or sleeve 37, having a rectangular bore capable of receiving the rectangular surface of the shaft 31, as illustrated in Fig. 5, and upon four or more opposed edges of the plate an angled blade 38 is rigidly attached, the cutting-surface of which blade extends horizontally beyond one face of the plate, the lower or cutting edge of the said blade being in alignment with one of the corners of the plate, as best illustrated in Fig. 5.

The blades 38, which constitute the digging or hoe blades, are made to project alternately from opposite sides of the plate, except the plates located at the extreme ends of the shaft 31, the digging-blades of these latter hoes being inclined inward, as best illustrated in Fig. 1.

Above each digging-blade 38 a cutting-blade 39 is secured to the plate or body of the hoe A, which cutting-blades extend outward from the periphery of the plate in a plane with the side of the latter and at a right angle outward beyond the digging-blades.

When the several hoes A are secured upon the shaft 31, they are so arranged that the approaching edges of the digging-blades of the opposed hoes will essentially overlap; and the said hoes A are further so arranged that the digging-blades of two opposed hoes will not strike the ground at the same time. Thus it will be observed that every inch of the surface between the end or outer hoes will be pulverized as the machine advances. When the shaft 31 is revolved, the cutting-blades 39 sever any weeds that may be upon the surface of the ground, and the hoe or digging blades following effectually upturn the soil in the same manner as though a regular hoe were employed.

In order to raise and lower the hoe-carrying shaft 31 at will, a rock-shaft 40 is journaled in the frame transversely of the same, as illustrated in Fig. 1, provided near each end with an arm 41, extending downward at a right angle, the said arms being connected by a chain 42 with the hoe-shaft 31, at or near the extremities of the latter, the chain-connection being made in order that the said hoe-shaft may freely rise to pass any obstruction when the hoes are in operation. The rock-shaft is manipulated through a lever 42ª, fulcrumed upon one of the central beams of the frame, which lever is provided with an attached spring-actuated pawl 43, adapted for engagement with a rack 44, as shown in Fig. 2. The lever 42ª is connected by a link 45 with an arm 46, projected upward from the rock-shaft. The lever 42ª is located adjacent to the driver's seat, in order that the said driver may conveniently and expeditiously raise or lower the hoes when it is desired to do so.

The tongue 47 is pivoted between the forward ends of the central beams 10 and 11, and may be raised or lowered, as desired, when occasion may require, through the medium of a foot-lever 48, fulcrumed between the beams 10 and 11 and actuated by a spring 49, as illustrated in Fig. 3, which foot-lever is provided with a lug 50, capable of engaging with a series of notches 51, produced in the rear face of a segmental bar 52, rigidly secured to the rear extremity of the tongue. The manipulation of the tongue by the lever 48 is fully illustrated in Fig. 3.

While specific construction has been shown and described, I desire it to be distinctly understood that other equivalent construction may be employed without departing from the spirit of the invention.

Having thus described my invention, I claim as new and desire to secure by Letters Patent—

1. The combination of a frame, a drive-shaft mounted in said frame, road-wheels loosely mounted upon said drive-shaft, dogs secured to the road-wheels, engaging ratchet-wheels rigidly fastened to the drive-shaft, a master-wheel secured upon the drive-shaft, transverse shafts carrying pinions meshing with the master-wheel, a hoe-shaft driven from the pinion-shafts, and hoes secured upon the said hoe-shaft, substantially as shown and described.

2. The combination, with a frame, a drive-shaft mounted in said frame, road-wheels loosely mounted upon said drive-shaft, dogs secured to the road-wheels, engaging ratchet-wheels rigidly fastened to the drive-shaft, a master-wheel secured upon the drive-shaft, and transverse shafts carrying pinions meshing with the master-wheel, of a hoe-shaft driven from the pinion-shafts, a series of hoes rigidly fastened upon the said hoe-shaft, consisting of a polygonal plate having a series of horizontal digging-blades attached to the edges thereof, extending alternately in opposite directions, and cutting-blades rigidly attached to the side of the plate, projecting outward beyond the digging-blades at a right angle thereto, and means, substantially as shown and described, for raising and lowering the hoe-shaft, as and for the purpose specified.

3. The combination, with a frame, a drive-shaft mounted in said frame, road-wheels loosely mounted upon said drive-shaft, dogs secured to the road-wheels, engaging ratchet-wheels rigidly fastened to the drive-shaft, a master-wheel secured upon the drive-shaft, and transverse shafts carrying pinions meshing with the master-wheel, of a hoe-shaft journaled at the rear of the implement and driven from the pinion-carrying shafts, a standard secured to the hoe-shaft and projecting through the frame, a spring surrounding the standard between the shaft and frame, and a series of hoes secured to the hoe-shaft, all combined for operation substantially as and for the purpose specified.

4. In a revolving horse-hoe, a hoe consisting of a polygonal plate provided with a series of horizontal digging-blades secured to the edge thereof, and cutting-blades attached to its side extending over and beyond the digging-blades, substantially as and for the purpose specified.

5. In a revolving horse-hoe, a hoe comprising a polygonal plate having a series of horizontal digging-blades secured to the edge thereof, alternately extending beyond opposite faces of the plate, and cutting-blades rigidly secured to the plate and extending over and beyond the digging-blades, substantially as and for the purpose specified.

ARD G. EMERY.

Witnesses:
J. L. DUNHAM,
FRED L. MARTIN.